US008633290B2

(12) United States Patent
Kawamoto et al.

(10) Patent No.: US 8,633,290 B2
(45) Date of Patent: Jan. 21, 2014

(54) OPTICAL RESIN, OPTICAL RESIN COMPOSITION, OPTICAL FILM, AND FILM

(75) Inventors: Satoshi Kawamoto, Sodegaura (JP); Kouichi Kizu, Narashino (JP); Sunil Krzysztof Moorthi, Ichihara (JP); Akira Sakai, Osaka (JP)

(73) Assignees: Mitsui Chemicals, Inc., Minato-Ku, Tokyo (JP); Sharp Corporation, Osaka-Shi, Osaka (JP)

( * ) Notice: Subject to any disclaimer, the term of this patent is extended or adjusted under 35 U.S.C. 154(b) by 342 days.

(21) Appl. No.: 13/002,186

(22) PCT Filed: Jul. 13, 2009

(86) PCT No.: PCT/JP2009/003265
§ 371 (c)(1),
(2), (4) Date: Dec. 30, 2010

(87) PCT Pub. No.: WO2010/007753
PCT Pub. Date: Jan. 21, 2010

(65) Prior Publication Data
US 2011/0105710 A1 May 5, 2011

(30) Foreign Application Priority Data

Jul. 15, 2008 (JP) .................................. 2008-183442

(51) Int. Cl.
*C08F 210/14* (2006.01)
*C08F 210/00* (2006.01)

(52) U.S. Cl.
USPC ..................... 526/348.2; 526/348; 526/348.6; 528/396

(58) Field of Classification Search
USPC .................................... 526/348.2, 348.4, 348
See application file for complete search history.

(56) References Cited

U.S. PATENT DOCUMENTS

| 3,091,601 | A | * | 5/1963 | Reding et al. | 526/159 |
| 3,472,917 | A | * | 10/1969 | Vetter et al. | 525/268 |
| 3,635,921 | A | * | 1/1972 | Hambling | 526/348.5 |
| 3,755,500 | A | * | 8/1973 | Clark | 525/321 |
| 2009/0161045 | A1 | * | 6/2009 | Kawamoto et al. | 349/98 |

FOREIGN PATENT DOCUMENTS

| GB | 968935 | A | | 9/1964 | |
| GB | 1085914 | | * | 10/1967 | C08F 1/28 |
| JP | 51-1756 | B1 | | 1/1976 | |
| JP | 56-76416 | A | | 6/1981 | |
| JP | 63-46205 | A | * | 2/1988 | C08F 210/10 |
| JP | 4-284402 | A | | 10/1992 | |
| JP | 09-071613 | A | * | 3/1997 | C08F 210/14 |
| JP | 9-71613 | A | | 3/1997 | |
| JP | 2005-350601 | A | * | 12/2005 | C08L 23/18 |
| WO | WO 2007/129464 | A1 | * | 11/2005 | G02B 5/30 |
| WO | WO 2007/129464 | A1 | | 11/2007 | |

OTHER PUBLICATIONS

JP 09-071613 A; Nakagawa et al. Mar. 1997; abstract and translation in English.*
JP 2005-350601 A; Tanaka et al. Dec. 2005; abstract and translation in English.*
R. B. Isaacson et al., "Properties of Semicrystalline Polyolefins. II. Copolymers of 3-Methyl-1-pentene and 4-Methyl-1-pentene", Journal of Applied Polymer Science, vol. 9, 1965, pp. 933-940.
International Search Report (PCT/ISA/210) dated Oct. 6, 2009.

* cited by examiner

*Primary Examiner* — Rip A. Lee
(74) *Attorney, Agent, or Firm* — Buchanan Ingersoll & Rooney PC

(57) ABSTRACT

An optical resin comprises a copolymer of 4-methyl-1-pentene and at least one monomer selected from the group consisting of 3-methyl-1-pentene, 3-methyl-1-butene and 4,4-dimethyl-1-pentene. The content of a constituent unit (a) derived from 4-methyl-1-pentene is equal to or more than 60 mol % and equal to or less than 99 mol %, and the total content of a constituent unit (b) derived from at least one monomer selected from the group consisting of 3-methyl-1-pentene, 3-methyl-1-butene and 4,4-dimethyl-1-pentene is equal to or more than 1 mol % and equal to or less than 40 mol %.

3 Claims, No Drawings

OPTICAL RESIN, OPTICAL RESIN COMPOSITION, OPTICAL FILM, AND FILM

CROSS-REFERENCE TO RELATED APPLICATIONS

This application is a National Stage under §371 of PCT/JP2009/003265, filed Jul. 13, 2009, which in turn claims priority to Japanese Application No. 2008-183442, filed Jul. 15, 2008, the entire content of each of which is incorporated herein by reference.

TECHNICAL FIELD

The present invention relates to an optical resin, an optical resin composition, an optical film, and a film.

BACKGROUND ART

With the development of various display devices in recent years, importance of various optical components such as a retardation plate, a polarizing plate and the like has been increased.

For example, in Patent Document 1, there has been disclosed a retardation compensation sheet obtained by stretching and orienting a polymer mainly comprising 4-methylpentene-1.

This retardation compensation sheet is to widen the viewing angle of a liquid crystal display. By using such a retardation compensation sheet, it is possible to provide a good liquid crystal display having a high contrast ratio in a wide temperature range.

Patent Document 1: Japanese Patent Laid-open No. H4 (1992)-284402
Patent Document 2: Japanese Patent Laid-open No. S56 (1981)-76416
Patent Document 3: WO 2007/129464
Non-patent Document 1: Journal of Applied Polymer Science, Vol. 9, 933 (1965)

DISCLOSURE OF THE INVENTION

In late years, it has been demanded for optical components to exhibit more stabilized optical properties without depending on the temperature change. However, in the retardation compensation sheet obtained by stretching and orienting a polymer mainly comprising 4-methylpentene-1 as described in Patent Document 1, the birefringence changes greatly with temperature, so that it is difficult to achieve stabilized optical properties.

The present invention is to provide an optical resin, an optical resin composition, an optical film and a film which can exhibit more stabilized optical properties without depending on the temperature change.

The present invention provides optical resins as follows:

[1] an optical resin comprising a copolymer of 4-methyl-1-pentene and at least one monomer selected from the group consisting of 3-methyl-1-pentene, 3-methyl-1-butene and 4,4-dimethyl-1-pentene, wherein the content of a constituent unit (a) derived from the aforementioned 4-methyl-1-pentene is equal to or more than 60 mol % and equal to or less than 99 mol %, and the total content of a constituent unit (b) derived from the aforementioned at least one monomer selected from the group consisting of 3-methyl-1-pentene, 3-methyl-1-butene and 4,4-dimethyl-1-pentene is equal to or more than 1 mol % and equal to or less than 40 mol %;

[2] an optical resin comprising a copolymer of 4-methyl-1-hexene and 3-methyl-1-butene, wherein the content of a constituent unit (c) derived from the aforementioned 4-methyl-1-hexene is equal to or more than 60 mol % and equal to or less than 99 mol %, and the total content of a constituent unit (d) derived from the aforementioned 3-methyl-1-butene is equal to or more than 1 mol % and equal to or less than 40 mol %;

[3] the optical resin as set forth in [1], wherein the content of the constituent unit derived from the aforementioned 3-methyl-1-pentene is equal to or more than 5 mol % and equal to or less than 40 mol %,

[4] the optical resin as set forth in [1] or [2], wherein the content of the constituent unit derived from the aforementioned 3-methyl-1-butene is equal to or more than 5 mol % and equal to or less than 40 mol %;

[5] an optical resin composition comprising the optical resin as set forth in any one of [1] to [4];

[6] an optical film comprising the optical resin as set forth in any one of [1] to [4];

[7] the optical film as set forth in [6], wherein the light transmittance at a wavelength of 590 nm is not less than 80%, and the optical film satisfies both conditions of the following formulae (1) and (2);

$$R(450)/R(590) \leq 0.95 \quad (1)$$

(In the above formula (1), each of R(450) and R(590) represents the in-plane retardation of the optical film at wavelengths of 450 nm or 590 nm.), $$|dR(590)/dT/R(590) \times 100| \leq 2.0 (\%/°C.) \quad (2)$$

(In the above formula (2), dR(590)/dT represents the change per 1 degree centigrade of the in-plane retardation of the optical film at a wavelength of 590 nm; and R(590) represents the in-plane retardation of the optical film at a wavelength of 590 nm.); and

[8] a film having the light transmittance at a wavelength of 590 nm of not less than 80%, and satisfying both conditions of the following formulae (1) and (2), $$R(450)/R(590) \leq 0.95 \quad (1)$$

(In the above formula (1), each of R(450) and R(590) represents the in-plane retardation of the film at wavelengths of 450 nm or 590 nm.)

$$|dR(590)/dT/R(590) \times 100| \leq 2.0 (\%/°C.) \quad (2)$$

(In the above formula (2), dR(590)/dT represents the change per 1 degree centigrade of the in-plane retardation of the film at a wavelength of 590 nm; and R(590) represents the in-plane retardation of the film at a wavelength of 590 nm.)

According to the present invention, there are provided an optical resin, an optical resin composition, an optical film and a film which can exhibit much stabilized optical properties without depending on the temperature change.

BEST MODE FOR CARRYING OUT THE INVENTION

The embodiments of the present invention will be described below.

Firstly, an outline of the optical resin of this embodiment will be described.

The optical resin of this embodiment comprises a copolymer of 4-methyl-1-pentene and at least one monomer selected from the group consisting of 3-methyl-1-pentene, 3-methyl-1-butene and 4,4-dimethyl-1-pentene, wherein the content of a constituent unit (a) derived from the aforementioned 4-methyl-1-pentene is equal to or more than 60 mol % and equal to or less than 99 mol %, based on the total optical resin, and the total content of a constituent unit (b) derived from the aforementioned at least one monomer selected from the group consisting of 3-methyl-1-pentene, 3-methyl-1-butene and 4,4-dimethyl-1-pentene is equal to or more than 1 mol % and equal to or less than 40 mol %, based on the total optical resin.

The optical resin of this embodiment may be an optical resin comprising a copolymer of 4-methyl-1-hexene and 3-methyl-1-butene, wherein the content of a constituent unit (c) derived from the aforementioned 4-methyl-1-hexene is equal to or more than 60 mol % and equal to or less than 99 mol %, and the total content of a constituent unit (d) derived from the aforementioned 3-methyl-1-butene is equal to or more than 1 mol % and equal to or less than 40 mol %.

Using such an optical resin, an optical film can be prepared.

The optical film using such an optical resin has the light transmittance at a wavelength of 590 nm of not less than 80%, and has both properties of the following (1) and (2);

$$R(450)/R(590) \leq 0.95 \quad (1)$$

(In the above formula (1), each of R(450) and R(590) represents the in-plane retardation of the film at wavelengths of 450 nm or 590 nm.), $$|dR(590)/dT/R(590) \times 100| \leq 2.0 (\%/° C.) \quad (2)$$

(In the above formula (2), dR(590)/dT represents the change per 1 degree centigrade of the in-plane retardation of the film at a wavelength of 590 nm; and R(590) represents the in-plane retardation of the film at a wavelength of 590 nm.).

Herein, the optical film may be composed of only an optical resin or may contain an optical resin composition containing an optical resin. That is, the optical film may contain the optical resin in a part.

The optical resin and the optical film will be described in more detail below.

The optical resin comprises a copolymer of 4-methyl-1-pentene and at least one monomer selected from the group consisting of 3-methyl-1-pentene, 3-methyl-1-butene and 4,4-dimethyl-1-pentene.

Herein, the copolymer may be obtained by polymerizing 4-methyl-1-pentene only with at least one monomer selected from the group consisting of 3-methyl-1-pentene, 3-methyl-1-butene and 4,4-dimethyl-1-pentene, or may be obtained by polymerizing 4-methyl-1-pentene with two or more monomers selected from the group consisting of 3-methyl-1-pentene, 3-methyl-1-butene and 4,4-dimethyl-1-pentene.

Furthermore, although the copolymer may be copolymerized with other monomers as other copolymerization component, it is preferable that other monomers as described above may not be contained.

Based on the total copolymer, the content of the constituent unit (a) derived from 4-methyl-1-pentene may be equal to or more than 60 mol % and equal to or less than 99 mol %, and the total content of the constituent unit (b) derived from at least one monomer selected from the group consisting of 3-methyl-1-pentene, 3-methyl-1-butene and 4,4-dimethyl-1-pentene may be equal to or more than 1 mol % and equal to or less than 40 mol %.

By having the contents of the constituent units (a) and (b) within the above range, it is possible to suppress the change of the in-plane retardation of the optical film in accordance with the change in temperature, while maintaining the property of the above formula (1), i.e., strong point of poly-4-methyl-1-pentene.

In particular, when R(450)/R(590) in the property of the above formula (1) is intended to be small, it is preferable to increase the content of the constituent unit (a). Also, when |dR(590)/dT/R(590)×100| in the property of the above formula (2) is intended to be small, it is preferable to increase the content of the constituent unit (b).

The content of the constituent unit (a) derived from 4-methyl-1-pentene is preferably equal to or more than 70 mol % and equal to or less than 90 mol %, and particularly preferably equal to or more than 70 mol % and equal to or less than 85 mol %.

(Regarding Content of Constituent Unit (b))

The constituent unit (b) is contained in a crystal of the constituent unit derived from poly-4-methyl-1-pentene at a predetermined ratio, whereby the change in birefringence of the crystal phase depending on the temperature is considered to be suppressed. Herein, the crystal structure of poly-4-methyl-1-pentene is known as a 7/2 helical structure. Although this structure is a 2-turn helical structure with 7 monomers, the number of monomers to introduce the constituent unit (b) into these 7 monomers is 3 at the most so that the properties of poly-4-methyl-1-pentene are maintained. That is, the content of the constituent unit (b) is preferably equal to or more than 1 mol % and equal to or less than 40 mol %. When it exceeds 40 mol %, the crystal structure of poly-4-methyl-1-pentene might not be maintained, and accordingly it is possible to lose its feature that is the reverse wavelength dispersion property of birefringence (property of the above formula (1)); therefore, it is not preferable. Furthermore, with less than 1 mol %, an object of the present invention, i.e., suppression of the dependence of the birefringence on the temperature (property of the above formula (2)), might not be fully achieved.

Furthermore, in order to ensure full suppression of the dependence of the birefringence on the temperature, the content of the constituent unit (b) is preferably not less than 5 mol %, further preferably equal to or more than 10 mol % and equal to or less than 30 mol %, and particularly preferably equal to or more than 15 mol % and equal to or less than 30 mol %, based on the total copolymer.

In particular, from the viewpoints of suppression of the dependence of the birefringence on the temperature and reverse wavelength dispersion property, the content of the constituent unit derived from 3-methyl-1-pentene or 3-methyl-1-butene is preferably equal to or more than 5 mol % and equal to or less than 40 mol %.

For the constituent unit (b), preferably used is a monomer having a structure similar to 4-methyl-1-pentene. The reason is because such a monomer has a similarity to 4-methyl-1-pentene so that it is possible to maintain the crystal structure derived from poly-4-methyl-1-pentene and it is further possible to maintain the property of the above formula (1).

Furthermore, for the constituent unit (b), preferably used is a monomer having a branched structure. The reason is because, in the optical film composed of poly-4-methyl-1-pentene, the in-plane retardation of the film caused by the change in temperature can be effectively suppressed by using a monomer having a branched structure. The monomer having a branched structure has higher density in the vicinity of a main chain as compared to a monomer having a linear structure. Thus, by copolymerizing these monomers, it is assumed that particularly the molecular motion of a side chain of poly-4-methyl-1-pentene is suppressed by the steric hindrance with the constituent unit (b), and further the change of the in-plane retardation of the film is suppressed.

From the same reason, for the optical resin comprising a copolymer using the constituent unit (c) derived from 4-methyl-1-hexene in place of the constituent unit (a), the change of the in-plane retardation of the film is also suppressed.

When the constituent unit (c) derived from 4-methyl-1-hexene is used, it is preferable to use the constituent unit (d) derived from 3-methyl-1-butene as a copolymerization component. As for the composition of the copolymer having such a configuration, it is preferable that the content of the constituent unit (c) derived from 4-methyl-1-hexene is equal to or more than 60 mol % and equal to or less than 99 mol %, and the total content of the constituent unit (d) derived from 3-methyl-1-butene is equal to or more than 1 mol % and equal to or less than 40 mol % and particularly preferably equal to or more than 5 mol % and equal to or less than 40 mol %.

Furthermore, by having the contents of the constituent units (c) and (d) within the above range, it is possible to suppress the change of the in-plane retardation of the optical film in accordance with the change in temperature while maintaining the property of the above formula (1), i.e., feature of poly-4-methyl-1-hexene.

When R(450)/R(590) in the property of the above formula (1) is intended to be small, it is preferable to increase the content of the constituent unit (c). When |dR(590)/dT/R(590)×100| in the property of the above formula (2) is intended to be small, it is preferable to increase the content of the constituent unit (d).

The content of the constituent unit (c) derived from 4-methyl-1-hexene is preferably equal to or more than 70 mol % and equal to or less than 90 mol % and particularly preferably equal to or more than 70 mol % and equal to or less than 85 mol %.

4-methyl-1-hexene has almost the same optical properties as 4-methyl-1-pentene.

Incidentally, although the optical resin comprising a copolymer using the constituent unit (c) derived from 4-methyl-1-hexene may also be copolymerized with other monomers as other copolymerization component, it is preferable that other monomers as described above may not be contained.

Composition analysis of poly-4-methyl-1-pentene and the poly-4-methyl-1-pentene copolymer (composition analysis of constituent units (a) and (b)) can be performed by measuring $^{13}$C-NMR spectra under the predetermined conditions, using a nuclear magnetic resonance apparatus, Mercury-400 model, manufactured by Varian, Inc. Composition analysis of the above 4-methyl-1-hexene copolymer can also be performed in the same manner.

The melt flow rate (MFR) of the above optical resin measured in accordance with ASTM D1238 under the conditions of a load of 5 kg and a temperature of 260 degrees centigrade is decided in many ways depending on the use, but it is usually equal to or more than 1 g/10 min and equal to or less than 50 g/10 min, preferably equal to or more than 2 g/10 min and equal to or less than 40 g/10 min, and further preferably equal to or more than 5 g/10 min and equal to or less than 30 g/10 min. When the melt flow rate of the optical resin is excessively small, for example, melt extrusion molding might be difficult. When it is excessively high, for example, the flowing of the resin extruded from a T-die in melt extrusion molding is fast so that it might be difficult to have a uniform film thickness on a cast roll. When the melt flow rate of the optical resin is within the above range, the film moldability and the appearance of the obtained film are good.

Meanwhile, the melting point of the optical resin is, for example, not less than 100 degrees centigrade and preferably not less than 150 degrees centigrade from the viewpoint of further improvement of heat resistance. The melting point of the optical resin is, for example, not more than 260 degrees centigrade and preferably not more than 240 degrees centigrade from the viewpoint of further improvement of moldability in melt extrusion molding.

A method for preparing the optical resin will be described below.

The optical resin can be prepared by using a known catalyst such as a Ziegler-Natta catalyst, a metallocene catalyst or the like under the suitable production conditions.

Incidentally, in Patent Document 2 and Non-Patent Document 1, there has been disclosed a copolymer of 4-methyl-1-pentene and 3-methyl-1-pentene. However, there has not been disclosed that it is possible to form a film exhibiting the reverse wavelength dispersion to be described later and achieving stabilized optical properties in a wide temperature range at the same time, i.e., with less change in the retardation caused by the change in temperature, by using such a copolymer for the optical use. Besides, it is not assumed that a film exhibiting the reverse wavelength dispersion to be described later and achieving stabilized optical properties in a wide temperature range at the same time is obtained by using a copolymer of 4-methyl-1-pentene and 3-methyl-1-pentene, since LCD (liquid crystal display device) or the like has not been industrialized at the time of filing Patent Document 2 or at the time of preparing Non-Patent Document 1. It is difficult to use the copolymer for the optical use as disclosed in Patent Document 2 or Non-Patent Document 1 which assumes totally different purpose from that of an optical film.

Meanwhile, in Patent Document 3, there has been disclosed a copolymer of 4-methyl-1-pentene. However, Patent Document 3 does not disclose Examples of a copolymer of 4-methyl-1-pentene and 3-methyl-1-pentene, and Patent Document 3 does not recognize the fact that effects are markedly expressed such that the reverse wavelength dispersion to be described later is exhibited and stabilized optical properties in a wide temperature range are achieved at the same time by the proportion of 4-methyl-1-pentene to 3-methyl-1-pentene.

From Patent Document 3 which does not recognize the aforementioned effects, in the copolymer of 4-methyl-1-pentene and 3-methyl-1-pentene obtained by carrying out relatively complex polymerization, it is not possible to assume that the proportion of 4-methyl-1-pentene to 3-methyl-1-pentene is adjusted.

Furthermore, a conventional film composed of a 4-methyl-1-pentene resin has a property of being fragile and easily broken even though a melting point is high. Therefore, mechanical properties are generally improved by forming a copolymer, but at this time, C6 to C16 α-olefin being highly effective for improving mechanical properties has been preferably used as a copolymerization component. In Patent Document 3, examples of the copolymerization component of the copolymer of 4-methyl-1-pentene include 1-decene, 1-dodecene and the like, whereas the copolymer of 4-methyl-1-pentene and 3-methyl-1-pentene is not assumed.

The optical film using the optical resin will be described below.

The optical film contains any of the aforementioned optical resins and an optical resin composition containing other components. The optical film may be composed of any of the aforementioned optical resins without containing other components.

As other components, various resins or various rubbers may be used. As various resins, particularly preferably used is a resin excellent in transparency, and there can be used, for example, various polyolefins such as a cyclic olefin (co)polymer and the like, polycarbonate, polystyrene, a cellulose acetate resin, a fluorinated resin, polyester, an acrylic resin and the like. As various rubbers, there can be used olefin based rubber, styrene based rubber and the like.

Furthermore, to the optical film used in this embodiment, there can be added various compounding ingredients to be used by adding usual polyolefin such as an anti-static agent, an antioxidant, a heat resistant stabilizer, a release agent, a weather resistant stabilizer, a rust prevention agent, a slipping agent, a nucleating agent, a pigment, a dye, an inorganic filler (silica or the like) and the like, or other special compounding ingredients in addition thereto, in the ranges in which the object of the present invention is not damaged.

The optical film is an optical film excellent in balancing the reverse wavelength dispersion and temperature stability, and having both properties of the formulae (1) and (2), in which the light transmittance at a wavelength of 590 nm is not less than 80% as described below;

$$R(450)/R(590) \leq 0.95 \tag{1}$$

(In the above formula (1), each of R(450) and R(590) represents the retardation (retardation value) in the plane of the aforementioned film at wavelengths of 450 nm or 590 nm.), $$|dR(590)/dT/R(590) \times 100| \leq 2.0(\%/^\circ C.) \tag{2}$$

(In the above formula (2), dR(590)/dT represents the change per 1 degree centigrade of the in-plane retardation of the aforementioned film at a wavelength of 590 nm; and R(590) represents the retardation (retardation value) in the plane of the aforementioned film at a wavelength of 590 nm.).

The optical film exhibiting the reverse wavelength dispersion can be achieved by satisfying the above formula (1).

In particular, R(450)/R(590) is preferably not more than 0.87, and more preferably not more than 0.85.

In this way, the optical film can be constructed to exhibit the reverse wavelength dispersion with more ideal birefringence. Accordingly, the film is suitably used as a retardation plate or the like used for display or the like using light in a wide wavelength range.

Incidentally, the retardation is measured at 23 degrees centigrade and a relative humidity of 50% using a retardation measuring device.

Furthermore, the lower limit of R(450)/R(590) is not particularly limited, but it can be, for example, not less than 0.60 from the viewpoint of more stably controlling the retardation caused by birefringence.

Meanwhile, stabilized optical properties in a wide temperature range can be achieved by satisfying the formula (2).

|dR(590)/dT/R(590)×100| may be not more than 2.0, but particularly preferably not more than 1.5.

Incidentally, the lower limit is not particularly limited, but it may be not less than 0.

dR(590)/dT/R(590) is determined from dR(590)/dT=(R(590, 120° C.)−R(590, 30° C.))/(120−30) using the retardation value at 30 degrees centigrade (R(590, 30° C.)) and retardation value at 120 degrees centigrade (R(590, 120° C.)).

The optical film having such properties is obtained by properly adjusting the molding conditions using the optical resin as described above.

For example, the optical resin can be molded into a film, for example, by a method involving mixing the aforementioned optical resin with other components using a V-blender, a ribbon blender, a Henschel mixer or a tumbler blender, a method involving mixing using the aforementioned blender and then melt kneading with a single screw extruder, a multi-screw extruder, a kneader, a banbury mixer or the like for granulating or pulverizing, and then press molding, extrusion molding, inflation molding and the like, a solution casting method or the like. For more efficient production, preferably used are a solution casting method, an inflation molding method and an extrusion molding method.

Furthermore, by stretching the film, physical properties such as birefringence, its angle dependence and the like can be optically adjusted to a desired value, and a film further provided with mechanical strength can also be made. A stretching ratio may be suitably selected according to desired optical properties or the like, but it is usually not less than 1.5 times and preferably not less than 2 times from the viewpoint that uniform stretching or desired birefringence are further surely obtained. Furthermore, a stretching ratio of the film is usually not more than 10 times and preferably not more than 5 times from the viewpoint of making the production process easy.

Meanwhile, the film is formed by a melt extrusion molding method and then oriented by stretching, whereby the film can be further effectively and stably produced. When melt extrusion molding is carried out, specifically, molding is carried out using a single screw extruder at a predetermined cylinder temperature and a predetermined cast roll temperature, and then stretch-molding is conducted using a drawing machine at not less than a glass transition temperature (Tg), at a temperature of not more than 200 degrees centigrade and preferably not more than 180 degrees centigrade only at predetermined magnifications (preferably not more than 5 times and particularly preferably not more than 3 times) at a predetermined stretching rate. From the viewpoint that the degree of crystallization and the crystal size are not increased, it is preferable that a stretching ratio is rather small, and the stretching speed is rather high. Furthermore, stretching may be any of uniaxial stretching, biaxial stretching or the like. From the viewpoint that the degree of crystallization and the crystal size are not increased, more preferably used is biaxial stretching rather than uniaxial stretching.

Incidentally, at this time, a raw sheet-like film is once prepared at the time of melt extrusion molding, the raw sheet may be supplied to the stretch-molding apparatus again, or melt extrusion molding and stretch-molding may be continuously carried out.

Furthermore, when a film is obtained by melt extrusion molding, it may be pressure compressed between rolls of the extruder, so that transparency of the thus-obtained film can be more heightened.

The thickness of the optical film may be properly set depending on the purpose of use, particularly the birefringence of the optical component and its wavelength dependence, and is not particularly limited. However, it is usually equal to or more than 10 μm and equal to or less than 200 μm and preferably equal to or more than 20 μm and equal to or less than 100 μm. When the optical film is too thin, easiness of handling might be reduced. When it is too thick, it might be difficult to be dealt with by the roll, the length per roll might be shortened and the like. When the thickness of the optical film is within the above range, the productivity of the film is excellent, pinholes or the like are not generated during molding of the film, and sufficient strength is further obtained as well; therefore, such a thickness is preferable. Indeed, the reason why the optical design usually takes priority is as described above.

Incidentally, there is no particular upper limit in the thickness of the optical film, and those conventionally called a sheet in the present Technical Field are also included. Furthermore, it is preferable that the thickness is capable of being used for the optical use.

The optical film as described above can be used as a protective film for a polarizing plate.

The retardation caused by birefringence can be generally expressed by an angle as well. At this time, the conversion formula of the retardation R1 expressed by an angle and the retardation R2 in the unit of nm is represented by, $$R1(\text{degree})=(R2(\text{nm})/\lambda(\text{nm}))\times 360(\text{degree})$$

Incidentally, λ is a retardation measuring wavelength.

The magnitude of the retardation R1 of the protective film for a polarizing plate has influence on the polarization degree of the polarizing plate. For example, when the protective film is used for a liquid crystal display device, the image quality such as contrast of the liquid crystal display device is affected. That is, even when R2 is always constant to the retardation measuring wavelength in use, R1 becomes high as the wavelength is shorter so that the retardation of the protective film deteriorates the polarization degree of a linear polarizing plate as the wavelength is shorter. Accordingly, the retardation represented by R2 is preferably small as the wavelength is shorter. For example, if the influence of the retardation of the protective film on the polarization degree of the polarizing plate is entirely the same in the visible light region, it is preferable that the change of R2 to wavelength λ approaches the change of wavelength λ. This means that the retardation represented by R2 is preferably small as the wavelength is shorter. However, usually in any of transparent films composed of a polymer material used for the protective film for a polarizing plate, it is common that R2 becomes high as the wavelength is shorter, or is constant at best.

On the other hand, the optical film of this embodiment is an optical film exhibiting the reverse wavelength dispersion as described above. More specifically, since it satisfies the formula (1), the retardation represented by R2 can be made small as the wavelength is shorter and it becomes possible to suppress a phenomenon such that the retardation of the protective film deteriorates the polarization degree of the linear polarizing plate. Thus, such a film is practically highly valuable.

Furthermore, as described above, the optical film of this embodiment can achieve stabilized optical properties in a wide temperature range. Specifically, since it satisfies the formula (2), it is possible to obtain the film in which change of the retardation by the temperature change is small.

Furthermore, the aforementioned optical film can be used as an optical compensation film. The reason why the retardation represented by R2 of the optical compensation film is preferably small as the wavelength is shorter is the same as that described for the case of the aforementioned protective film for a polarizing plate. Furthermore, the aforementioned optical film is used as an optical compensation film, whereby stabilized optical properties in a wide temperature range can be achieved. Examples of the optical compensation film include a retardation film and a viewing angle compensation film.

Furthermore, the aforementioned optical film may be used for the axis compensation of the polarizing plate. As a method of axis compensation of the polarizing plate, there can be cited, for example, −A−C compensation, +A+C compensation and +A−A compensation. A uniaxially stretched product becomes an −A plate, and the optical film of the present invention herein is combined with a −C plate to be described below, whereby the −A−C compensation method can be carried out. In the same manner, the optical film is combined with an +A plate, whereby the +A−A compensation method can be carried out. Further, a biaxially stretched product becomes a +C plate, and the retardation film of the present invention is combined with an +A plate, whereby the +A+C compensation method can be carried out.

Herein, the A plate refers to an optical film satisfying nx>ny=nz or nz=nx>ny, while the C plate refers to an optical film satisfying nx=ny>nz or nz>nx=ny. Furthermore, in a refractive index ellipsoid having nx, ny and nz, a case of a symmetry axis being a long axis refers to + (positive), while a case of a symmetry axis being a short axis refers to − (negative). Accordingly, for example, the above optical film satisfying nx>ny=nz becomes an +A plate.

The optical film or laminated plate as described above can be used in display elements.

Examples of the display element include liquid crystal display elements and EL display elements.

Furthermore, it may be used for various display elements of touch panels, field emission displays, LEDs or the like.

Further, the present invention is not restricted to the aforementioned embodiments, and modifications, improvements and the like are intended to be included within the scope of the present invention in the ranges in which the object of the present invention can be achieved.

Example 1

Preparation of Solid Formed Titanium Catalyst Component

A solid formed titanium catalyst component used for polymerization of an optical resin of this Example was prepared in the following manner.

750 g of anhydrous magnesium chloride, 2,800 g of decane and 3,080 g of 2-ethylhexyl alcohol were reacted under heating at 130 degrees centigrade for 3 hours to give a homogeneous solution. Then, to this solution was added 220 ml of 2-isobutyl-2-isopropyl-1,3-dimethoxypropane, and the mixture was further stirred at 100 degrees centigrade for 1 hour. The homogeneous solution thus obtained was cooled to room temperature, and then the total amount of 3,000 ml of this homogeneous solution was added dropwise to 800 ml of titanium tetrachloride, which was maintained at −20 degrees centigrade under stirring over a period of 45 minutes. After completion of the dropwise addition, the temperature of the resulting mixture was elevated to 110 degrees centigrade over a period of 4.5 hours, and when the temperature reached 110 degrees centigrade, to the mixture was added 5.2 ml of 2-isobutyl-2-isopropyl-1,3-dimethoxypropane, which was then kept under stirring for 2 hours at the same temperature. After completion of the 2-hour reaction, the mixture was hot filtered to separate a solid part. The solid part was resuspended in 1,000 ml of titanium tetrachloride, and then the resulting suspension was again heated at 110 degrees centigrade for 2 hours to carry out a reaction. After completion of the reaction, the mixture was again hot filtered to separate a solid part. The solid was thoroughly washed with decane and hexane at 90 degrees centigrade until no free titanium compound was detected in the wash liquid. The solid formed titanium catalyst component prepared by the above process was stored as a decane slurry, but a part thereof was dried for the purpose of examining the catalyst composition. The catalyst component thus obtained had a composition comprising 3.0% by mass of titanium, 17.0% by mass of magnesium, 57% by mass of chlorine, 18.8% by mass of 2-isobutyl-2-isopropyl-1,3-dimethoxypropane and 1.3% by mass of 2-ethylhexyl alcohol.

Method for Preparing poly-4-methyl-1-pentene Copolymer

To a polymerization reactor having an inner volume of 1.5 liter were added 400 ml of 4-methyl-1-pentene, 180 ml of 3-methyl-1-pentene (3M1P) as a comonomer, 1.8 mmol of triethylaluminum and 0.09 mmol in terms of titanium atom of the catalyst obtained by preliminarily polymerizing 3-methyl-1-pentene at room temperature. The temperature of the polymerization reactor inside was elevated to 60 degrees centigrade for maintaining the temperature. After 120 minutes of polymerization, the powders were taken out from the polymerization reactor, filtered, and then washed with hexane to obtain a powder-like poly-4-methyl-1-pentene copolymer. The obtained polymer had the yield of 65 g. In the obtained copolymer, the content of the structural unit derived from the comonomer, i.e., 3-methyl-1-pentene, was 1.4 mol %, the intrinsic viscosity [η] was 3.5 dl/g, the melting point was 236.8 degrees centigrade, and the heat of fusion was 43.8 J/g.

A film having a film thickness of about 100 μm was prepared using the powder-like poly-4-methyl-1-pentene copolymer obtained by polymerization as described above in a hot-press method at 280 degrees centigrade.

This film was subjected to free-end uniaxial stretching using a tensile testing machine. Stretching herein was carried out to make a film thickness after stretching between 10 and 50 μm. The evaluation results of optical characteristics of the resulting uniaxially stretched film are shown in Table 1 along with the copolymer composition.

Example 2

A copolymer and a uniaxially stretched film were prepared in accordance with Example 1, except that the comonomer concentration, the catalyst concentration and the polymerization time were adjusted.

In the obtained copolymer, the content of the comonomer was 10.6 mol %, the intrinsic viscosity [η] was 3.7 dl/g, the melting point was 235.3 degrees centigrade, and the amount of melting heat was 42.6 J/g. The evaluation results of optical characteristics of the resulting uniaxially stretched film are shown in Table 1 along with the copolymer composition.

Example 3

A copolymer and a uniaxially stretched film were prepared in accordance with Example 1, except that the comonomer concentration, the catalyst concentration and the polymerization time were adjusted.

In the obtained copolymer, the content of the comonomer was 17.2 mol %, the intrinsic viscosity [η] was 3.4 dl/g, the melting point was 234.7 degrees centigrade, and the amount of melting heat was 46.2 J/g. The evaluation results of optical characteristics of the resulting uniaxially stretched film are shown in Table 1 along with the copolymer composition.

Example 4

A copolymer and a uniaxially stretched film were prepared in accordance with Example 1, except that the comonomer concentration, the catalyst concentration and the polymerization time were adjusted.

In the obtained copolymer, the content of the comonomer was 34.9 mol %, the intrinsic viscosity [η] was 3.1 dl/g, the melting point was 233.5 degrees centigrade, and the amount of melting heat was 46.5 J/g. The evaluation results of optical characteristics of the resulting uniaxially stretched film are shown in Table 1 along with the copolymer composition.

Example 5

A copolymer and a uniaxially stretched film were prepared in accordance with Example 1, except that the comonomer was changed to 3-methyl-1-butene (3M1B), and the comonomer concentration, the catalyst concentration and the polymerization time were adjusted.

In the obtained copolymer, the content of the comonomer was 10 mol %, the intrinsic viscosity [η] was 2.5 dl/g, the melting point was 215.4 degrees centigrade, and the amount of melting heat was 33.7 J/g. The evaluation results of optical characteristics of the resulting uniaxially stretched film are shown in Table 1 along with the copolymer composition.

Example 6

A copolymer and a uniaxially stretched film were prepared in accordance with Example 1, except that the comonomer was changed to 4,4-dimethyl-1-pentene (4,4DM1P), and the comonomer concentration, the catalyst concentration and the polymerization time were adjusted.

In the obtained copolymer, the content of the comonomer was 17 mol %, the intrinsic viscosity [η] was 2.4 dl/g, the melting point was 222.1 degrees centigrade, and the amount of melting heat was 28.0 J/g. The evaluation results of optical characteristics of the resulting uniaxially stretched film are shown in Table 1 along with the copolymer composition.

Comparative Example 1

A copolymer and a uniaxially stretched film were prepared in accordance with Example 1, except that the comonomer concentration, the catalyst concentration and the polymerization time were adjusted.

In the obtained copolymer, the content of the comonomer was 50.9 mol %, the intrinsic viscosity [η] was 2.9 dl/g, the melting point was 230.7 degrees centigrade, and the amount of melting heat was 36.2 J/g. The evaluation results of optical characteristics of the resulting uniaxially stretched film are shown in Table 1 along with the copolymer composition.

Comparative Example 2

A copolymer and a uniaxially stretched film were prepared in accordance with Example 1, except that the catalyst concentration and the polymerization time were adjusted except that without using a comonomer, and the catalyst concentration and the polymerization time were adjusted.

The obtained polymer was poly-4-methyl-1-pentene, in which the intrinsic viscosity [η] was 2.0 dl/g, the melting point was 240.0 degrees centigrade, and the amount of melting heat was 45.1 J/g. The evaluation results of optical characteristics of the resulting uniaxially stretched film are shown in Table 1 along with the copolymer composition.

Comparative Example 3

A copolymer and a uniaxially stretched film were prepared in accordance with Example 1, except that the comonomer was changed to 1-hexene, and the comonomer concentration, the catalyst concentration and the polymerization time were adjusted.

In the obtained copolymer, the content of the comonomer was 6.6 mol %, the intrinsic viscosity [η] was 2.3 dl/g, the melting point was 216.4 degrees centigrade, and the amount of melting heat was 37.8 J/g. The evaluation results of optical characteristics of the resulting uniaxially stretched film are shown in Table 1 along with the copolymer composition.

Comparative Example 4

A copolymer and a uniaxially stretched film were prepared in accordance with Example 1, except that the comonomer was changed to 1-hexene, and the comonomer concentration, the catalyst concentration and the polymerization time were adjusted.

In the obtained copolymer, the content of the comonomer was 13.1 mol %, the intrinsic viscosity [η] was 2.3 dl/g, the melting point was 200.2 degrees centigrade, and the amount of melting heat was 32.1 J/g. The evaluation results of optical characteristics of the resulting uniaxially stretched film are shown in Table 1 along with the copolymer composition.

Comparative Example 5

A copolymer and a uniaxially stretched film were prepared in accordance with Example 1, except that the comonomer was changed to 1-hexene, and the comonomer concentration, the catalyst concentration and the polymerization time were adjusted.

In the obtained copolymer, the content of the comonomer was 21.7 mol %, the intrinsic viscosity [η] was 2.2 dl/g, the melting point was 179.0 degrees centigrade, and the amount of melting heat was 25.6 J/g. The evaluation results of optical characteristics of the resulting uniaxially stretched film are shown in Table 1 along with the copolymer composition.

Comparative Example 6

A copolymer and a uniaxially stretched film were prepared in accordance with Example 1, except that the comonomer was changed to 1-octene, and the comonomer concentration, the catalyst concentration and the polymerization time were adjusted.

In the obtained copolymer, the content of the comonomer was 7.9 mol %, the intrinsic viscosity [η] was 2.2 dl/g, the melting point was 189.1 degrees centigrade, and the amount of melting heat was 24.5 J/g. The evaluation results of optical characteristics of the resulting uniaxially stretched film are shown in Table 1 along with the copolymer composition.

Quantitative analysis of 4-methyl-1-pentene and the copolymerization component was measured under the following conditions using a nuclear magnetic resonance apparatus, Mercury-400 model, manufactured by Varian, Inc.

Solvent: mixed solvent of deuterated benzene/o-dichlorobenzene
Sample concentration: 50 to 100g/1-solvent
Inter pulse period: 5.5 seconds
Integration frequency: 6,000 to 16,000 times
Measurement temperature: 120 degrees centigrade Composition of 4-methyl-1-pentene and the copolymerization component was quantitatively analyzed by $^{13}$C-NMR spectra measured under the above conditions.

Intrinsic viscosity [η]: Using a viscometer (Type VNR053U Model manufactured by Rigo Co., Ltd.), the specific viscosity of a sample, which was obtained by dissolving 0.25 to 0.30 g of a resin in 25 ml of decalin, was measured at 135 degrees centigrade in accordance with ASTM J1601, and the concentration was extrapolated to 0 to determine the ratio of the specific viscosity to the concentration as the intrinsic viscosity [η].

Melting point (Tm) and heat of fusion: The melting point (Tm) was measured under a $N_2$ (nitrogen) atmosphere using DSC-220C, a product of Seiko Instruments Inc. The copolymer was heated from room temperature to 270 degrees centigrade at a temperature increase rate of 50 degrees centigrade/min and then allowed to stand for 5 minutes, and subsequently cooled to −50 degrees centigrade at a temperature decrease rate of 10 degrees centigrade/min and allowed to stand for 5 minutes. The temperature of an endothermic peak was obtained when the temperature was elevated to 270 degrees centigrade at a temperature increase rate of 10 degrees centigrade/min. The heat of fusion per the unit weight was obtained from the endothermic peak area.

Wavelength dispersion of birefringence: The retardations at wavelengths of 450 nm and 590 nm were measured at 23

TABLE 1

| | Monomer Forming Constituent Unit (b) | Content Of Constituent Unit (b) (mol %) | Content Of Constituent Unit (a) (mol %) | Light Transmittance (%) | Wavelength Dispersion of Birefringence {R(450)/R(590)} | Change Rate of Birefringence (%/° C.) |
|---|---|---|---|---|---|---|
| Example 1 | 3M1P | 1.4 | 98.6 | 93.2 | 0.65 | −1.9 |
| Example 2 | 3M1P | 10.6 | 89.4 | 93.5 | 0.70 | −1.5 |
| Example 3 | 3M1P | 17.2 | 82.8 | 93.3 | 0.91 | −1.1 |
| Example 4 | 3M1P | 34.9 | 65.1 | 93.1 | 0.94 | 0.4 |
| Example 5 | 3M1B | 10 | 90 | 93.2 | 0.92 | −0.62 |
| Example 6 | 4,4DM1P | 17 | 83 | 93.5 | 0.71 | −1.9 |
| Comp. Example 1 | 3M1P | 50.9 | 49.1 | 92.9 | 1.04 | −0.6 |
| Comp. Example 2 | — | 0 | 100 | 93.7 | 0.73 | −3.5 |
| Comp. Example 3 | 1-hexene | 6.6 | 93.4 | 93.5 | 0.62 | −5.3 |
| Comp. Example 4 | 1-hexene | 13.1 | 86.9 | 93.2 | −0.12 | −15 |
| Comp. Example 5 | 1-hexene | 21.7 | 78.3 | 92.8 | 2.2 | 16 |
| Comp. Example 6 | 1-octene | 7.9 | 92.1 | 93.0 | 0.75 | −3.4 |

Incidentally, in respective Examples and Comparative Examples, a method for measuring the monomer ratio and intrinsic viscosity, and a method for measuring the melting point, heat of fusion, light transmittance, wavelength dispersion of birefringence, and change rate of birefringence are as follows.

degrees centigrade and a relative humidity of 50% by using a measurement device, RETS-100, a product of Otsuka Electronics Co., Ltd. In the device, using a polarization optical system, the retardation (retardation at an oblique angle of 0°) of a sample was obtained by performing polarization analysis after passing through the sample.

Method for measuring change rate of birefringence: The retardation was measured in the same manner as in the wavelength dispersion of birefringence to measure the retardation value at 30 degrees centigrade (R(590, 30° C.)) and the retardation value at 120 degrees centigrade (R(590, 120° C.)). Then dR(590)/dT/R(590)=(R(590, 120° C.)−R(590, 30° C.))/(120−30) was obtained. Incidentally, the relative humidity was 50%.

Light transmittance: A 50 square-mm sample was cut from the film, and the transmittance at a wavelength of 590 nm was measured using a spectrophotometer.

In Examples 1 to 6, there were obtained optical films satisfying R(450)/R(590)≤0.95 and |dR(590)/dT/R(590)×100|≤2.0(%/° C.), and excellent in temperature stability while exhibiting the reverse wavelength dispersion of birefringence at the same time.

On the other hand, in Comparative Examples, no reverse wavelength dispersion of birefringence was exhibited, or optical films poor in temperature stability were obtained.

Incidentally, it was found that, when the content of the constituent unit (b) derived from the comonomer was equal to or more than 1 mol % and equal to or less than 40 mol %, and the content of constituent unit (a) derived from 4-methyl-1-pentene was equal to or more than 60 mol % and equal to or less than 99 mol %, there was obtained an optical film excellent in temperature stability while exhibiting the reverse wavelength dispersion of birefringence at the same time, in the same manner as in the above Examples.

In particular, by having the content of the constituent unit (b) derived from 3-methyl-1-pentene or 3-methyl-1-butene of not less than 5 mol %, there was obtained an optical film more excellent in temperature stability while exhibiting the reverse wavelength dispersion of birefringence at the same time.

The invention claimed is:

1. An optical compensation film comprising an optical resin,
wherein said optical resin comprises:
a copolymer of 4-methyl-1-pentene, and
at least one monomer selected from the group consisting of 3-methyl-1-pentene, 3-methyl-1-butene and 4,4-dimethyl-1-pentene;
wherein, in said optical resin,
the content of a constituent unit (a) derived from said 4-methyl-1-pentene is equal to or more than 60 mol % and equal to or less than 99 mol %, and
the total content of a constituent unit (b) derived from said at least one monomer selected from the group consisting of 3-methyl-1-pentene, 3-methyl-1-butene and 4,4-dimethyl-1-pentene is equal to or more than 1 mol % and equal to or less than 40 mol %;
wherein the light transmittance at a wavelength of 590 nm is not less than 80%, and the optical film satisfies both conditions of the following formulae (1) and (2);

$$R(450)/R(590) < 0.95 \tag{1}$$

wherein in the above formula (1), each of R(450) and R(590) represents the in-plane retardation of the optical film at wavelengths of 450 nm or 590 nm, $$|dR(590)/dT/R(590) \times 100| < 2.0 (\%/°C.) \tag{2}$$

wherein in the above formula (2), dR(590)/dT represents the change per 1 degree centigrade of the in-plane retardation of the optical film at a wavelength of 590 nm; and R(590) represents the in-plane retardation of the optical film at a wavelength of 590 nm; and wherein said film is stretched to not less than 1.5 times and not more than 10 times.

2. The optical film as set forth in claim 1,
wherein the content of the constituent unit derived from said 3-methyl-1-pentene in said optical resin is equal to or more than 5 mol % and equal to or less than 40 mol %.

3. The optical film as set forth in claim 1,
wherein the content of the constituent unit derived from said 3-methyl-1-butene in said optical resin is equal to or more than 5 mol % and equal to or less than 40 mol %.

* * * * *